United States Patent [19]

Canonne

[11] 4,010,283
[45] Mar. 1, 1977

[54] COATING METHOD IMPROVING PRESERVATION AND ENABLING OVERTASTING OF CONFECTIONERY ARTICLES WITH A BASE OF GUM ARABIC OR SIMILAR PRODUCTS

[75] Inventor: Jacques Edmond Marie Canonne, Geneva, Switzerland

[73] Assignee: Soreat S.A., Geneva, Switzerland

[22] Filed: Oct. 15, 1975

[21] Appl. No.: 622,645

[30] Foreign Application Priority Data

Mar. 5, 1975   France .............................. 75.06926

[52] U.S. Cl. .............................. 426/100; 426/103; 426/304; 426/310; 426/573; 426/660; 426/444
[51] Int. Cl.² ...................... A23G 1/00; A23G 9/00
[58] Field of Search .......... 426/303, 304, 310, 573, 426/660, 100, 103, 307, 308, 444, 456, 512, 524, 803

[56] References Cited

UNITED STATES PATENTS

| | | | |
|---|---|---|---|
| 3,582,359 | 6/1971 | Horn | 426/573 |
| 3,622,352 | 11/1971 | Daylor | 426/303 |

*Primary Examiner*—Norman Yudkoff
*Assistant Examiner*—Martin G. Mullen
*Attorney, Agent, or Firm*—Browdy and Neimark

[57] ABSTRACT

Jujubes are molded in suitable molds having a desired shape and are then dried and refrigerated immediately at a low temperature to give them a rigid consistency. They are then coated with a varnish having a thickness which is very noticeable and a weight which can be greater than the weight usually provided for confectionery products. Next, they are submitted to fresh air at a temperature lower than 20° C to dry the varnish and they are then coated with sugar syrup which is dried thereon.

5 Claims, No Drawings

COATING METHOD IMPROVING PRESERVATION AND ENABLING OVERTASTING OF CONFECTIONERY ARTICLES WITH A BASE OF GUM ARABIC OR SIMILAR PRODUCTS

BACKGROUND OF THE INVENTION

The confectionery articles called jujube have the disadvantage of being badly protected against effects of the outside atmosphere even if these articles are packed in small bags which are more or less tight.

In fact it is easy to notice that after a preservation period, more or less long depending on the quality of the gum and adjuvants which are used, there occurs a loss of the water and of the volatile flavorings on the surface of the article. This phenomenon results in a progressive hardening of the article and the necessity to chew the article for a few seconds before tasting the aromatization of flavor which has been incorporated therein.

These disadvantages are a nuisance and dissuade some customers who prefer other types of sweets.

The present invention copes with these disadvantages by providing a new coating and an over-aromatization or over-tasting of jujubes and other similar confectionery articles.

SUMMARY OF THE INVENTION

The invention then relates to a coating method for improving preservation and over-aromatization of confectionery articles having a base of gum arabic comprising molding the articles in suitable molds having the desired shape, drying the articles and immediately refrigerating them at a low temperature to give them a rigid consistency, coating said refrigerated articles in at least one step by a varnish, subjecting the articles to fresh air at a temperature lower than 20° C to dry the varnish, and then coating with coats of sugar syrup dried thereon to constitute a sugar coating of a noticeable thickness.

According to another feature of the invention, the articles are dried and refrigerated, after having been formed, at a temperature within the range from 0° to 10° C, more especially within the range from 0° to 5° C.

DESCRIPTION OF A PREFERRED EMBODIMENT

There is given hereinbelow a preferred example for the coating and over-tasting method of confectionery articles according to the invention. The invention being also extended to confectionery articles obtained through this method.

The gum article used as a base is made according to the usual method of melting and flowing of a syrup of sugar and gum arabic or substitutes with addition of flavorings and, if required, some tartaric or citric acid and glucose. In the cases of formulas for pharmaceutical and dietetic use, the active principles are incorporated in this syrup.

The gum article is then poured into starch molds of a suitable shape which permits obtaining confectionery products of various shapes, but generally in the shape of a truncated cone, of a cylinder, or of a sphere.

The articles which are obtained are then dried and refrigerated immediately at about 5° C in order to give them a rigid consistency, which is an important condition to obtain a coating of good quality. This coating is performed in a sugar coating centrifugal machine. The articles, then cold and of a given shape, are poured in one or several centrifugal machines in which they immediately have a coating, called "varnishing", with a varnish constituted of an alcoholic solution of edible shellac. The shellac used is typically of a whitened and unwaxed quality found under the form of lamellas. This shellac comes from Far East countries and is made from secretions of insects fixed on some kinds of small trees (a variety of fig trees).

The varnish coating must be very thick and, generally at least double that of the coating of the usual sugar coated pill since its function is to stop, by an impassable barrier, the moisture and the flavorings contained in the core constituted by the gum article.

Besides, this coating forms, around the article, a rigid inseparable shell due to the hardness of the article which comes out from the refrigerated tunnel where there is a temperature within the range of a few ° C and lower than 5° or 6°.

This is a very important feature of the invention since it is necessary to prevent any subsequent contraction of the article, which could cause a cracking of the coating.

Drying of the varnished shell should be made in the presence of fresh air and at a temperature lower than 20° C.

The sugar coating step properly so called is made with non-aromatized or non flavored syrup used for the first coating, this non-aromatized syrup being very quickly replaced by an aromatized or flavored syrup. The sugar coating step can be made either with a colored or an uncolored syrup.

In this respect, there is always typically used a concentrated sugar syrup (it is of no importance that this syrup be made of a beet sugar or of a cane sugar). The sugar syrup may be added with a concentrated alcoholic solution of flavorings which may typically be within the range of 1 to 2% by weight of flavorings in the syrup. The syrup is sprayed and then dried in successive coatings. The first coatings and the last coating preferably use a mere sugar syrup without flavoring since they are above all protective and insulating coatings. However, the intermediary coatings which represent the major portion of the article are made with the flavored or aromatized syrup.

The coating is increased sufficiently to reach a weight which can be, for example, of 2 to 2.20 grams for a basic core of 1.20 to 1.25 grams.

There is thus obtained a sugar coated article which gives, upon the first contact with the tongue, a large portion of the taste of the flavoring used and which upon chewing will give the "softening" which is liked by the jujube lovers. Actually, usually, in the conventional articles this softening is very ephemeral.

What makes a difference, in the effect produced according to the present invention, between the products so obtained and those already known, is the noticeable increase of the aromatization tasting effect. Actually, this aromatization tasting of the products according to the invention by the gustative papilla of the tongue is instantaneous and increases instead of decreasing to become poor as is the case during the melting in the mouth of the other flavored products.

With an equal quantity of aromatization it is actually the jujube in accordance with the present invention which has a much stronger and longerlasting tasting, as compared with the sugar in the form of tablets, pills or chewing gum.

I claim:

1. In the method for producing confection acticles having a base of gum arabic comprising molding and drying the articles in a conventional manner, the improvement in preservation and over-aromatization comprising:
   after the drying step, immediately refrigerating the articles at a temperature within the range of from 0° to 10° C to give the articles a rigid consistency;
   coating the refrigerated articles in at least one step with a varnish;
   drying the varnish in air at a temperature lower than 20° C; and
   coating with coats of sugar syrup which after drying constitute a sugar coating of noticeable thickness.

2. Coating method as set forth in claim 1, wherein the varnish is an alcoholic solution of shellac.

3. A coating method as set forth in claim 1, wherein the temperature is within the range of 0° to 5° C.

4. A coating method as set forth in claim 3, wherein said alcoholic solution of shellac is aromatized and colored.

5. The product obtained according to the process of claim 1.

* * * * *